(12) United States Patent
Kheterpal et al.

(10) Patent No.: US 9,659,123 B2
(45) Date of Patent: May 23, 2017

(54) SYSTEMS AND METHODS FOR FLEXIBLY OPTIMIZING PROCESSING CIRCUIT EFFICIENCY

(71) Applicant: 21, Inc., San Francisco, CA (US)

(72) Inventors: Veerbhan Kheterpal, Santa Clara, CA (US); Daniel Firu, San Jose, CA (US); Nigel Drego, San Francisco, CA (US)

(73) Assignee: 21, Inc., San Francisco, CA (US)

( * ) Notice: Subject to any disclaimer, the term of this patent is extended or adjusted under 35 U.S.C. 154(b) by 0 days.

(21) Appl. No.: 14/738,635

(22) Filed: Jun. 12, 2015

(65) Prior Publication Data

US 2016/0110486 A1  Apr. 21, 2016

Related U.S. Application Data

(60) Provisional application No. 62/065,551, filed on Oct. 17, 2014.

(51) Int. Cl.
*G06F 17/50* (2006.01)

(52) U.S. Cl.
CPC ........ *G06F 17/5045* (2013.01); *G06F 17/505* (2013.01); *G06F 17/5072* (2013.01); *G06F 2217/08* (2013.01); *G06F 2217/62* (2013.01)

(58) Field of Classification Search
USPC ........ 716/101, 103, 104, 105, 115, 118, 131
See application file for complete search history.

(56) References Cited

U.S. PATENT DOCUMENTS 6,292,929 B2 *  9/2001  Scepanovic .................. 716/118
6,819,671 B1  11/2004  Chen et al.

(Continued)

FOREIGN PATENT DOCUMENTS

TW        453064 B      9/2001
TW     200405184 A      4/2004
(Continued)

OTHER PUBLICATIONS

Tucket et al., "Interactive Demonstration: This Is How You Mine Some Bitcoin," Bloomberg Businessweek, Jan. 13, 2014 [Retrieved on Apr. 14, 2014]. Retrieved from the Internet <URL: http://http://www.businessweek.com/printer/articles/1 85845-interactive-demonstration-this-is-how-you-mine-some-bitcoin>.

(Continued)

*Primary Examiner* — Brian Ngo
(74) *Attorney, Agent, or Firm* — Treyz Law Group, P.C.; Michael H. Lyons

(57) ABSTRACT

Circuit design equipment may design logic for a circuit. The design equipment may discover optimized design constraints and an optimized clock signal frequency for the circuit. The design equipment may output the discovered optimized clock signal frequency and design constraints to circuit fabrication equipment for fabricating the corresponding circuit. The design equipment may discover the optimized clock signal frequency and design constraints by populating a cost function with different clock signal frequencies and different design constraint values. The cost function may be, for example, a multi-dimensional surface. The design equipment may identify a global minimum of the cost function and may identify the clock signal frequency and design constraint values that correspond to the global minimum as the optimized clock frequency and optimized design constraints to provide to circuit fabrication equipment. The fabrication equipment may fabricate the circuit to implement the optimized design constraint values and clock frequency.

21 Claims, 6 Drawing Sheets

(56) References Cited

U.S. PATENT DOCUMENTS

| | | | |
|---|---|---|---|
| 6,823,500 B1* | 11/2004 | Ganesh | G06F 17/5072 716/115 |
| 6,829,355 B2 | 12/2004 | Lilly | |
| 7,142,669 B2 | 11/2006 | Dworkin et al. | |
| 7,237,214 B1* | 6/2007 | Pandey | G06F 17/5072 716/131 |
| 7,584,441 B2 | 9/2009 | Gidon et al. | |
| 7,757,187 B2 | 7/2010 | Kheterpal et al. | |
| 8,020,127 B1* | 9/2011 | Chan | G06F 17/5045 716/104 |
| 8,174,329 B2 | 5/2012 | Goodnow et al. | |
| 2005/0183054 A1* | 8/2005 | Wein | G06F 17/5072 716/105 |
| 2005/0278660 A1* | 12/2005 | Zhang | G06F 17/505 716/103 |
| 2008/0104552 A1 | 5/2008 | Yamada | |
| 2010/0086127 A1 | 4/2010 | Grinchuk et al. | |
| 2010/0318947 A1 | 12/2010 | Motiani et al. | |
| 2011/0050281 A1 | 3/2011 | Moe et al. | |
| 2012/0257742 A1 | 10/2012 | Ebeid et al. | |

FOREIGN PATENT DOCUMENTS

| | | |
|---|---|---|
| TW | 200604870 A | 2/2006 |
| TW | 200807314 A | 2/2008 |
| TW | 201038036 A | 10/2010 |
| TW | I338263 B | 3/2011 |
| TW | 201342211 A | 10/2013 |

OTHER PUBLICATIONS

Berke et al. "Bitcoin Demystified: A Hacker's Perspective,"HuffPost Code, Nov. 25, 2013 [Retrieved on Apr. 14, 2014]. Retrieved from the Internet <URL: http://www.huffingtonpost.com/201 3/11 /25/bitcoin-basics-explainedn4340 141 .html?view=print&comm_ref=false>.

"Mining," Bitcoin Wiki, Apr. 1, 2014 [Retrieved on Apr. 14, 2014]. Retrieved from the Internet <URL:https://en.bitcoin.it/wiki/Mining>.

Nakamoto, "Bitcoin: A Peer-to-Peer Electronic Cash System," www.bitcoio.org [Retrieved on Apr. 14, 2014]. Retrieved from the Internet <URL:https:Hbitcoin.org/bitcoin.pdf>.

"Block," Bitcoin Wiki, Mar. 2, 2014 [Retrieved on Apr. 14, 2014]. Retrieved from the Internet <URL:https://en.bitcoin.itlwiki/Block>.

Naik et al., "Optimising the SHA256 Hashing Algorithm for Faster and More Efficient Botcoin Mining", Sep. 2, 2013 (Sep. 2, 2013), 65 pages, XP055233141, Retrieved from the Internet: URL:http://www.nicolascourtois.com/bitcoin/Optimising the SHA256 Hashing Algorithm for Faster and More Efficient Bitcoin Mining_Rahul_Naik.pdf [retrieved on Dec. 2, 2015] p. 16-p. 35.

Shi et al., "Introduction to Hardware Security and Trust", Jan. 1, 2012 (Jan. 1, 2012), Springer New York, NY, XP055235885, ISBN: 978-1-4419-8080-9, p. 31-p. 45.

Sengupta et al., "Integrated scheduling, allocation and binding in High Level Synthesis using multi structure generic algorithm based design space exploration", Quality Electronic Design (ISQED), 2001 12th International Symposium On, IEEE, Mar. 14, 2011 (Mar. 14, 2011), pp. 1-9, XP031869278, DOI: 10.1109/ISQED.2011. 5770772 ISBAN: 978-1-61284-913-3.

Sengupta et al., "A high level synthesis design flow with a novel approach for efficient design space exploration in case of -multi-parametric optimization objective", Microelectronics and Reliability, Elsevier Science Ltd, GB, vol. 50, No. 3, Mar. 1, 2010 (Mar. 1, 2010), pp. 424-437, XP026917926, ISSN: 0026/2714, DOI: 10-1016/J.Microrel.2009.11.015 [retrieved on Feb. 20, 2010].

* cited by examiner

US 9,659,123 B2

1

SYSTEMS AND METHODS FOR FLEXIBLY OPTIMIZING PROCESSING CIRCUIT EFFICIENCY

This application claims the benefit of provisional patent application No. 62/065,551, filed Oct. 17, 2014, which is hereby incorporated by reference herein in its entirety.

BACKGROUND

This relates to integrated circuits and more particularly, to methods and systems for designing and fabricating integrated circuits.

Integrated circuits are often formed with processing circuitry that can perform desired logic functions and that is clocked using clock signals having a particular clock frequency. In a typical scenario, a logic designer uses computer-aided design tools on a circuit design system to generate a logic design for the processing circuitry so that the processing circuitry performs the desired logic functions. Once the circuit design system has generated the logic design, the logic design is provided to fabrication equipment that fabricates an integrated circuit that performs the desired logic functions as specified by the generated logic design.

Each logic design generated by the circuit design system can be characterized by a performance metric such as an efficiency value associated with the efficiency of that particular logic design. In conventional circuit design systems, the clock frequency of the clock signals received by the processing circuitry is pre-determined based on a fixed design standard such that all of the logic designs that are generated by the circuit design system are generated to implement that fixed clock frequency. In other words, the clock frequency of the processing circuitry is set as a fixed constraint while determining the logic design to be implemented on the processing circuitry.

However, in practice, a given logic design can exhibit different efficiencies for different clock frequencies, such that a particular logic design will not always exhibit optimal efficiency at the fixed standardized clock frequency. Processing circuits that are generated by the conventional circuit design system can thereby have sub-optimal efficiencies due to the imposition of the fixed clock frequency constraint during design of the processing circuits.

It may therefore be desirable to provide improved systems and methods for designing and fabricating processing circuitry.

SUMMARY

Circuit design computing equipment (e.g., a circuit design or logic design system) may design processing circuitry (e.g., logic for implementing on an integrated circuit). The circuit design computing equipment may discover optimized design constraint values associated with an integrated circuit and/or an optimized clock signal frequency for the integrated circuit. The design equipment may output the discovered optimized clock signal frequency and the discovered optimized design constraint for the integrated circuit to external equipment such as integrated circuit fabrication equipment.

The design equipment may discover the optimized clock signal frequency by identifying multiple different clock signal frequencies for the circuit and identifying a given clock signal that minimizes a corresponding cost function as the optimized clock signal frequency. The design equipment may discover the optimized design constraint by identifying multiple chip area constraints for the circuit (e.g., as identifying by a logic design for the circuit) and identifying the chip area constraint that minimizes the cost function as the optimized design constraint.

The design equipment may generate the cost function based on the different chip area constraints (or other design variables) and the different clock signal frequencies for the circuit. For example, the design equipment may populate the cost function using multiple different clock signal frequencies and multiple different design constraint values such as different circuit design architectures (e.g., hardware description language files), different aspect ratios for the circuit, different pin layouts for the circuit, different fabrication technology libraries for fabricating the circuit, different cell libraries for the circuit, etc. The design equipment may model (e.g., simulate) and characterize the performance of the circuit when provided with each combination of the clock signal frequencies and the design constraint values to populate the cost function, for example. The cost function may be, for example, a multi-dimensional surface. The design equipment may identify a global minimum of the cost function and may identify the clock signal frequency and the design constraint values that correspond to the global minimum as the optimal clock frequency and optimal design constraints to provide to circuit fabrication equipment.

Further features of the invention, its nature and various advantages will be more apparent from the accompanying drawings and the following detailed description of the preferred embodiments.

DETAILED DESCRIPTION

Embodiments of the present invention relate to integrated circuits, and more particularly, to ways for dynamically optimizing processing circuitry on integrated circuits.

Figure 1:
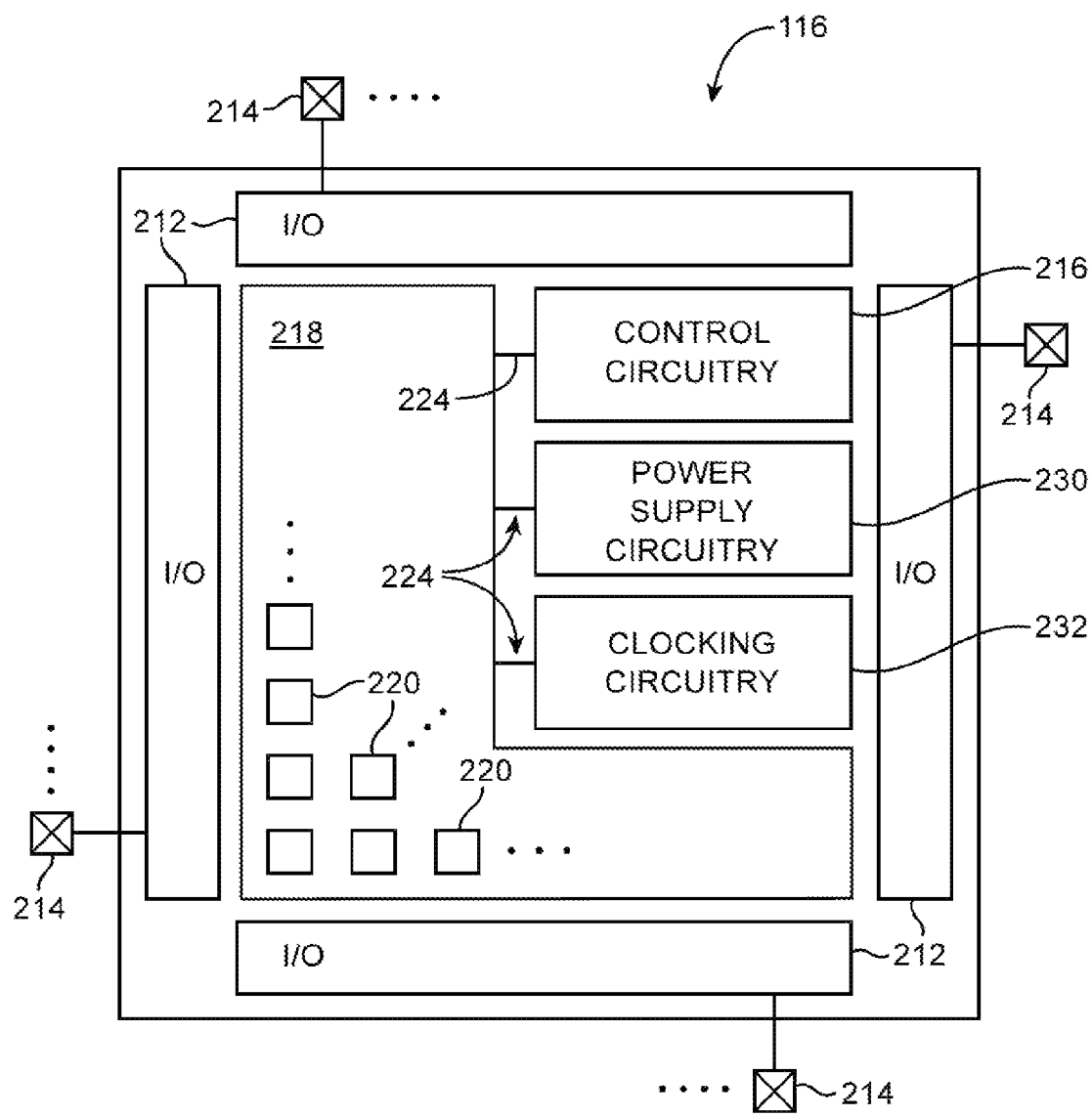
FIG. 1 is an illustrative diagram of an integrated circuit device that includes processing core circuits that may be designed and optimized to maximize efficiency of the core circuits using a circuit design system in accordance with an embodiment of the present invention.

Integrated circuits may contain memory elements, processing circuitry, or other suitable integrated circuit elements. As shown in FIG. 1, an integrated circuit such as integrated circuit 116 may have input-output (I/O) circuitry 212 for driving signals off of device 116 and for receiving signals from other devices via input-output pins 214. Integrated circuit 116 may be a memory chip, a digital signal processor (DSP), a microprocessor, an application specific integrated circuit (ASIC), or a programmable integrated circuit, for example.

Integrated circuit 116 may include processing circuitry formed in a region 218. Region 218 may sometimes be referred to herein as a processing core region or core region of integrated circuit 116. Integrated circuit 116 may include control circuitry such as control circuitry 216 that is coupled to core region 218 by paths 224. Paths 224 may, for example, be conductive interconnect paths such as vertical and/or horizontal conductive lines or buses connected between region 218 and control circuitry 216.

Core region 218 may include multiple processing core circuits 220 that are each controlled by control circuitry 216 to perform desired processing operations. In one suitable arrangement that is sometimes described herein as an example, integrated circuit 116 may perform processing operations to maintain a digital cryptocurrency. Digital currencies serve as a digital medium of exchange in which the digital currencies may be transferred in exchange for goods and services. Cryptocurrencies are examples of digital currencies in which cryptography governs the creation and exchange of value. An example of a cryptocurrency is the Bitcoin cryptocurrency that is governed by the Bitcoin protocol. This is in contrast to traditional mediums of exchange that are governed, for example, by a central authority.

The Bitcoin protocol defines a system in which the creation and distribution of the bitcoin cryptocurrency is governed by consensus among a peer-to-peer network (e.g., a peer-to-peer network to which integrated circuit 116 belongs). The network maintains a public ledger in which new transactions are verified and recorded by members of the network via cryptography. The operations of verifying and recording transactions of cryptocurrencies such as transactions in the bitcoin cryptocurrency are sometimes referred to as mining, because completion of each mining operation typically rewards the miner with newly created cryptocurrency (e.g., bitcoins). Bitcoin mining operations involve identifying a solution to a cryptographic puzzle in which transactions that are to be verified form part of the puzzle parameters. Bitcoin mining operations are typically performed via brute-force techniques (e.g., an exhaustive search for a puzzle solution performed across all possible solutions). The difficulty of the cryptographic puzzle has led to the use of dedicated circuitry designed specifically for Bitcoin mining.

If desired, control circuitry 216 may control processor cores 220 to perform an exhaustive search for a solution to a cryptographic puzzle as governed by the Bitcoin protocol (e.g., control circuitry 216 may control processor cores 220 to perform Bitcoin mining operations). If desired, control circuitry 216 may assign respective search spaces to each core 220 for searching for a solution to the cryptographic puzzle. This example is merely illustrative and, in general, processing cores 220 may perform any desired digital processing operations.

Integrated circuit 116 may include power supply circuitry such as power supply circuitry 230 and timing circuitry such as clock circuitry 232. Power supply circuitry 230 may power processing cores 220 (e.g., over paths 224). If desired, power supply circuitry 230 may supply the same amount of power to each core circuit 220 or may provide different amounts of power to different core circuits 220. Clocking circuitry 232 may generate a clocking signal having a desired clock frequency for controlling the timing of processing cores 220. Clocking circuitry 232 may generated the clocking signal using any desired clocking circuitry (e.g., a phase-locked loop (PLL) circuit, a voltage controlled oscillator (VCO) circuit, an off-chip crystal oscillator, etc.).

Processing cores 220 may include digital logic circuitry and any desired circuit elements for performing desired processing operations. For example, core circuits 220 may include, but are not limited to, structures such as metal-oxide-semiconductor field-effect transistors (MOSFETs), bipolar junction transistors (BJTs), diode structures, fuses, memory elements, resistors, capacitors, inductors, intellectual property (IP) blocks, digital logic circuitry such as adders, exclusive OR (XOR) gates, AND gates, and other suitable integrated circuit processing/storage components. Cores 220 may require a particular amount of power (e.g., from power supply circuitry 230) to perform desired processing operations and may require a particular amount of area on integrated circuit 116 to accommodate the circuit elements and logic that perform the desired processing operations.

Figure 2:
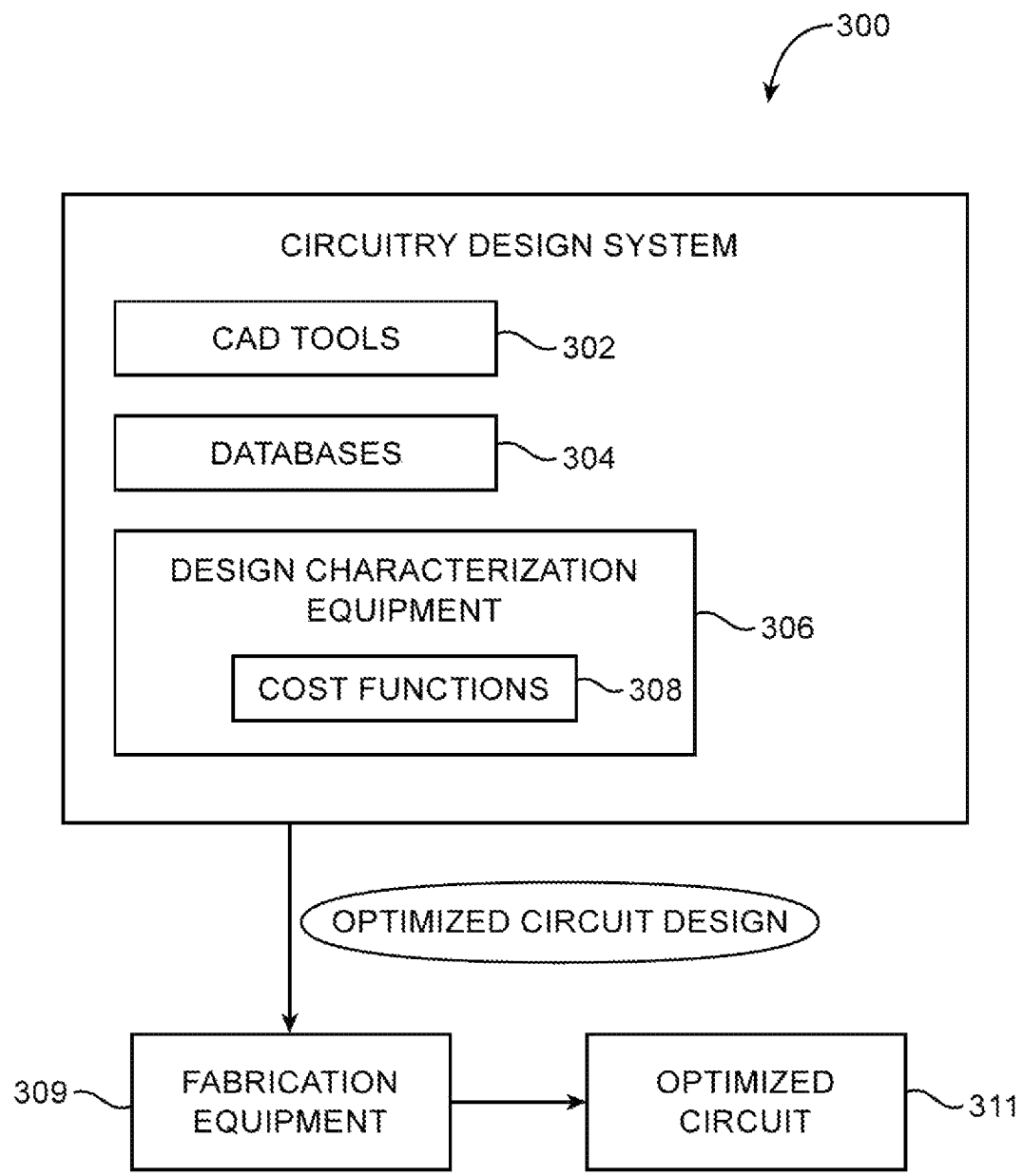
FIG. 2 is an illustrative diagram of a circuit design system that may generate designs for processing circuits of the type shown in FIG. 1 having optimized efficiency and that may provide the designs to circuit fabrication equipment in accordance with an embodiment of the present invention.

The various structures and components that are included in an integrated circuit can be designed using a circuit design system (e.g., the particular layout and arrangement of the circuitry and logic on each core 220 may be designed using a circuitry design system). An illustrative circuit design system 300 in accordance with an embodiment of the present invention is shown in FIG. 2. System 300 may be based on one or more processors such as personal computers, workstations, etc. Memory in these computers or external memory and storage devices such as internal and/or external hard disks may be used to store instructions and data for system 300.

Software-based components such as computer-aided design tools 302 and databases 304 may be implemented (stored) on system 300. During operation, executable software such as the software of computer aided design tools 302 runs on the processor(s) of system 300. Databases 304 may be used to store data for the operation of system 300. In general, software and data may be stored on any computer-readable medium (storage) in system 300. Such storage may include computer memory chips, removable and fixed media such as hard disk drives, flash memory, compact discs (CDs), digital versatile discs (DVDs), other optical media, and/or any other suitable memory or storage device(s). When the software of system 300 is installed, the storage of system 300 has instructions and data that cause the computing equipment in system 300 to execute various methods (processes). When performing these processes, the computing equipment is configured to implement the functions of the circuit design system.

The computer aided design (CAD) tools 302, some or all of which are sometimes referred to collectively as a CAD tool or an electronic design automation (EDA) tool, may be provided by a single vendor or by multiple vendors. Tools 302 may be provided as one or more suites of tools (e.g., a compiler suite for performing tasks associated with implementing a circuit design in a programmable logic device) and/or as one or more separate software components (tools). Database(s) 304 may include one or more databases that are accessed only by a particular tool or tools and may include one or more shared databases that are shared among tools.

CAD tools 302 may be used (e.g., by a logic designer or operator of circuitry design system 300) to generate one or more particular logic designs for processing cores 220. Circuitry design system 300 may include design characterization equipment such as design characterization equipment 306 (e.g., design characterization software that is independent from CAD tools 302 or that is integrated with CAD tools 302). Design characterization engine 306 may characterize the performance (e.g., one or more performance attributes) of the particular designs for processing cores 220 produced by CAD tools 302. Characterization engine 306 may process multiple designs for cores 220 produced by CAD tools 302 to identify an optimal design for cores 220 (e.g., a design that satisfies certain design constraints and/or that consumes an optimal amount of power and chip area).

In conventional arrangements, CAD tools 302 generate designs for core circuits 220 under the assumption that core circuits 220 are provided with clock signals having a fixed (standardized) clocking frequency by clocking circuitry 232 (i.e., core circuits 220 are generated for clocking with a clock signal having a fixed clock frequency that is set by a predetermined and standardized design specification for integrated circuit 116). In other words, the predetermined clock frequency is typically fixed as a design constraint for all logic designs generated by CAD tools 302. However, the optimal clock frequency for the clocking signal generated by circuitry 232 may depend on the particular logic design of processing cores 220 (e.g., some logic designs for core circuits 220 may be more efficient at certain clocking frequencies than other logic designs, etc.). This imposition of a standardized, predetermined clocking frequency design constraint may thereby lead to a sub-optimal clocking frequency and therefore inefficient performance of processing circuitry 220 for many designs of logic implemented on the processing circuitry.

If desired, CAD tools 302 of design system 300 may specify a number of different clocking frequencies for each logic design of core 220 and design characterization equipment 306 may process each logic design with each clocking frequency to determine an optimal clocking frequency for the particular logic design. By allowing design system 300 to discover an optimal clocking frequency, core 220 may be provided with a more efficient and flexible logic design than scenarios where the clocking frequency is set as a predetermined design constraint. If desired, CAD tools 302 may vary a number of different design variables when generating logic designs for circuitry 220. Design characterization equipment 306 may process each logic design with each possible combination of design variables to determine optimum values for each variable in addition to an optimal clocking frequency. In this way, design characterization equipment 306 may dynamically determine an optimal logic design for each of cores 220.

If desired, design characterization equipment 306 may determine optimal logic designs for cores 220 using one or more desired cost functions. For example, equipment 306 may minimize or otherwise optimize a cost function that takes as inputs one or more design variables associated with core 220. Equipment 306 may store information identifying one or more cost functions 308 (e.g., on storage circuitry implemented as a part of equipment 306). Equipment 306 may select one or more of cost functions 308 and may populate (generate) the cost function based on each logic design generated by CAD tools 302. Characterization equipment 306 may optimize the populated cost function to determine an optimal logic design for core 220 (e.g., optimal design variables such that those variables optimize the corresponding cost function 308).

Design system 300 may provide the optimal design for circuitry 220 to circuit fabrication equipment such as fabrication equipment 309. Design system 300 may provide the optimal design for circuitry 220 to fabrication equipment 309 as a data file or data structure, for example. Fabrication equipment 309 may process the circuit design received from design system 300 and may fabricate an optimized circuit 311 using the optimized design constraints identified by circuitry design system 300. For example, circuit 311 may be one or more of processing cores 220 or may be circuit 116 of FIG. 1.

Figure 3:
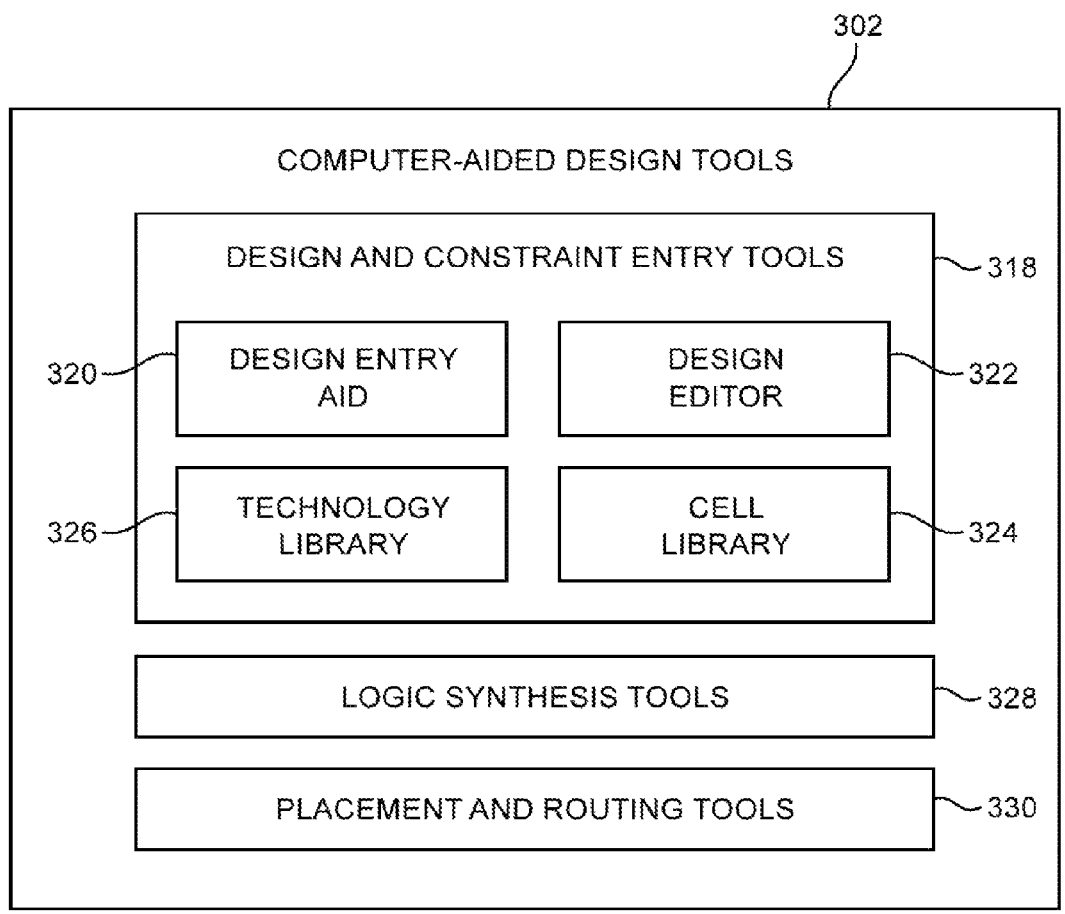
FIG. 3 is an illustrative diagram of computer aided design tools for generating designs for processing circuits having optimized efficiency given a set of different circuit design parameters in accordance with an embodiment of the present invention.

Illustrative computer aided design tools 302 that may be used in a circuit design system such as circuit design system 300 of FIG. 2 are shown in FIG. 3.

The design process for designing logic circuitry 220 may start with the formulation of functional specifications of the integrated circuit design (e.g., a functional or behavioral description of the integrated circuit design). A circuit designer may specify the functional operation of a desired circuit design using design and constraint entry tools 318. Design and constraint entry tools 318 may include tools such as design and constraint entry aid 320 and design editor 322. Design and constraint entry aids such as aid 320 may be used to help a circuit designer locate a desired design from a library of existing circuit designs and may provide computer-aided assistance to the circuit designer for entering (specifying) the desired circuit design.

Design and constraint entry tools 318 may be used to allow a circuit designer to provide a desired circuit design using any suitable format. For example, design and constraint entry tools 318 may include tools that allow the circuit designer to enter a circuit design using truth tables, a schematic capture tool, etc. Libraries of preexisting integrated circuit designs may be used to allow a desired portion of a design to be imported with the schematic capture tools. For example, design and constraint entry tools 318 may include one or more stored cell libraries 324 and one or more stored technology libraries 326 that are used in generating the circuit designs.

Technology libraries 326 may include libraries associated with one or more design technologies associated with the fabrication of cores 220. Each design technology identified by technology libraries 326 may include one or more associated cell libraries from cell library 324. Each cell library 324 may include a corresponding set of design blocks (sometimes referred to as intellectual property (IP) blocks) that perform desired logic functions (e.g., blocks that perform clocking operations, control operations, addition operations, etc.) so that a logic designer can design circuits to perform desired operations without designing low level (e.g., gate-level) implementations of the desired logic functions.

As an example, technology libraries 326 may include a first technology library associated with a first fabrication organization or company (e.g., a first organization that manufactures cores 220) and a second technology library associated with a second fabrication company (e.g., a second organization that manufactures cores 220). The first technology library may include one or more cell libraries that include different logic design blocks that may be used by a logic designer to design cores 220 whereas the second technology library may include one or more additional cell libraries that include different logic design blocks.

In one example, design and constraint entry aid 320 may be used to present screens of options for a user. The user may click on on-screen options to select whether the circuit being designed should have certain features. Design editor 322 may be used to enter a design (e.g., by entering lines of hardware description language code), may be used to edit a design obtained from a library (e.g., using a design and constraint entry aid), or may assist a user in selecting and editing appropriate prepackaged code/designs. For example, the user (circuit designer) may click on-screen options to select a particular design technology library 326 and one or more corresponding cell libraries 324 to use for designing core 220 and may subsequently use the logic design blocks of the selected cell libraries to design core 220.

In one suitable arrangement, design tools 318 may autonomously generate a number of different designs based on one or more design constraints provided by the circuit designer. Design characterization equipment 306 may analyze the autonomously generated designs to determine an optimal design. For example, equipment 306 may be used to simulate the functional performance of each circuit design. Each circuit design may be synthesized using tools 328. After logic synthesis using tools 328, the circuit design system may use tools such as placement and routing tools 330 to perform physical design steps (layout synthesis operations). Placement and routing tools 330 are used to determine where to place each gate of core 220 (e.g., each gate of a gate-level netlist produced by tools 328). The placement and routing tools 330 create orderly and efficient implementations of circuit designs for any targeted integrated circuit (e.g., for a given programmable integrated circuit such as a field-programmable gate array (FPGA)).

After processing multiple logic designs for cores 220 using placement and routing tools 330, design characterization equipment 306 (FIG. 2) may determine an optimal design using cost functions 308. The optimal implementation of the desired circuit design may be passed to circuit construction equipment (e.g., semi-conductor fabrication equipment or other circuit manufacturing equipment) that assembles integrated circuit 116 based on the optimal implementation of core 220 (e.g., by producing a mask-level layout description of the integrated circuit, etc.).

Figure 4:
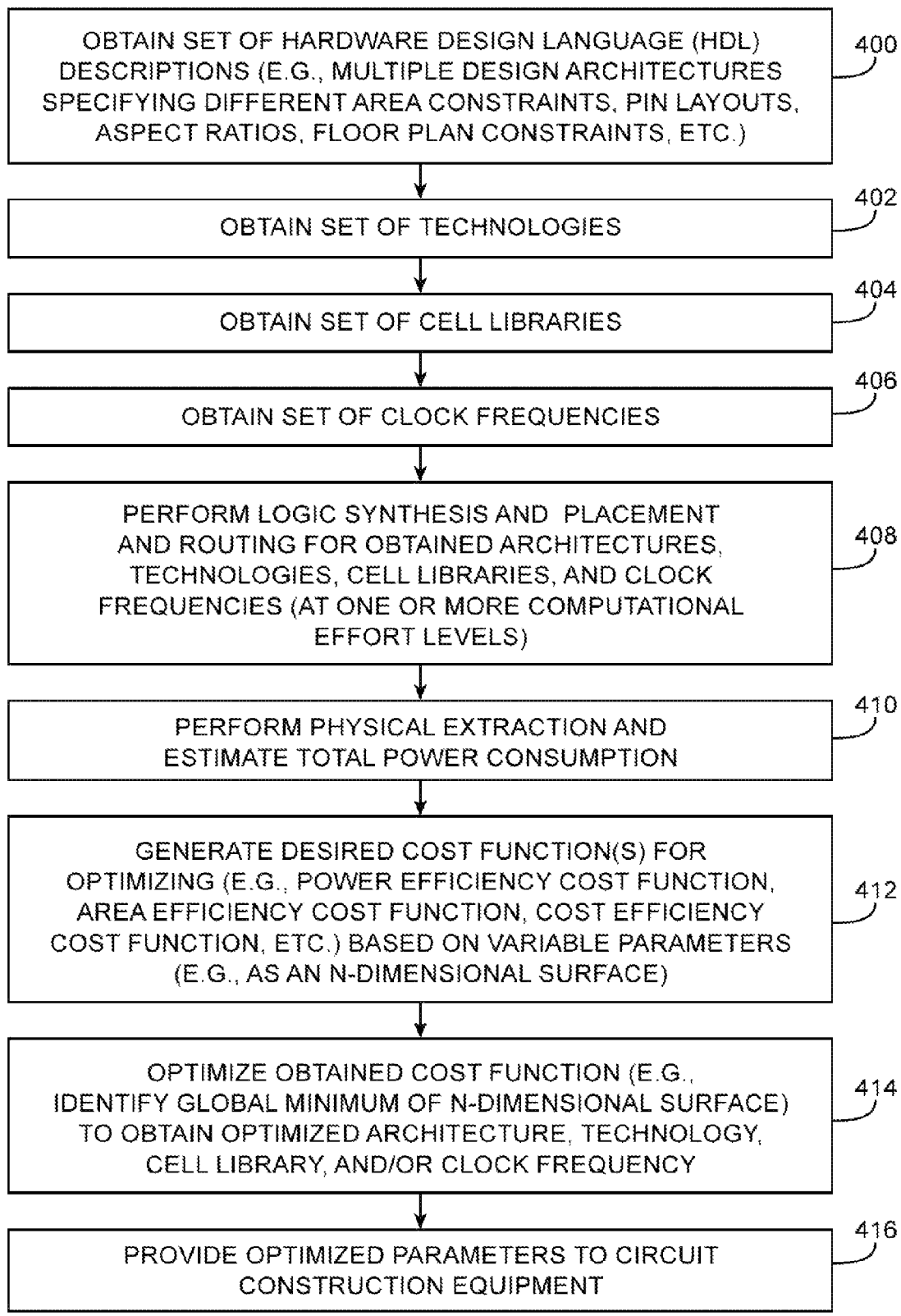
FIG. 4 is a flow chart of illustrative steps that may be performed by a circuit design system to generate processing circuit designs having optimized efficiency given a set of different circuit design parameters by populating and optimizing a corresponding efficiency cost function in accordance with an embodiment of the present invention.

FIG. 4 is a flow chart of illustrative steps that may be performed by circuitry design system 300 for autonomously determining an optimal implementation of processing circuitry 220 using a number of different variable design constraints. Design system 300 may determine the optimal implementation by identifying and characterizing different potential design variables for use in generating processing circuitry 220.

At step 400, system 300 may obtain a set of different design architectures for processing circuitry 220. For example, a circuit designer may specify one or more desired logical functions for circuitry 220 to perform and system 300 may autonomously generate a number of different circuit architectures that implement the desired logical functions. Each of the design architectures may have, for example, an associated area consumption, input/output pin layout, aspect ratio, floor plan, etc. Each design architecture may be identified by, for example, a corresponding Verilog hardware description language (Verilog HDL) design, Very High Speed Integrated Circuit Hardware Description Language (VHDL) design, SystemVerilog design, or a higher-level circuit description language design such as OpenCL or SystemC design.

In the example where processing circuitry 220 is controlled to perform Bitcoin mining operations, the circuit designer may instruct design system 300 to generate circuitry 220 that solves a cryptographic puzzle according to the Bitcoin protocol (e.g., that performs cryptographic hashing operations as required by the Bitcoin protocol). Design system 300 may autonomously generate a set of multiple different circuit architectures that implement the logical functions required to solve the cryptographic puzzle (e.g., architectures having different circuit floor plans, area consumptions, pin layouts, aspect ratios, etc.) each having corresponding HDL designs (e.g., design files).

At step 402, design system 300 may obtain a set of desired fabrication technologies (e.g., fabrication technologies) that may be used to build and implement processing circuitry 220 (e.g., one or more technology libraries 326 may be identified). As an example, one technology that may be used to implement circuitry 220 may be a Taiwan Semiconductor Manufacturing Company Limited® (TSMC) fabrication technology, whereas another technology that may be used to implement core 220 may be a Samsung® fabrication technology. Each fabrication technology may be associated with a number of different design cell libraries 324 that may be used to implement that fabrication technology. When applied to each design architecture (e.g., HDL description), each fabrication technology may generate a different physical implementation of processing circuitry 220 upon fabrication of integrated circuit 116. Design system 300 may autonomously select different fabrication technologies or a circuit designer may specify a number of different design technologies to test for generating an optimal design for circuit 220 (e.g., by providing a user input to design tools 302).

At step 404, design system 300 may obtain a set of cell libraries that may be used to build and implement processing circuitry 220. For example, system 300 may identify a set of cell libraries for each identified fabrication technology (e.g., as obtained at step 402). Design system 300 may autonomously select different cell libraries or a circuit designer may specify a number of different cell libraries to test (e.g., by providing a user input to design tools 302).

At step 406, design system 300 may identify a set of clock frequencies at which processing circuitry 220 is to operate (e.g., a set of possible clock frequencies to test for generating an optimal design for cores 220). For example, design system 300 may identify a range of different clock frequencies that may be used by circuitry 220. Design circuitry 300 may autonomously select different clock frequencies or a circuit designer may specify a number of different clock frequencies to test.

The example of FIG. 4 is merely illustrative. In general, steps 400-406 may be performed in any desired order and/or concurrently. For example, step 406 may be performed prior to step 400, concurrently with steps 400-404, etc. If desired, one or more of steps 400-406 may be omitted by fixing one of the hardware design language description, technology, cell library, and clock frequency as a set design constraint. By obtaining multiple different hardware design language descriptions, sets of design technologies, sets of cell libraries (sometimes referred to herein as logic libraries or IP libraries), and/or sets of clock frequencies, design tools 302 may generate many possible designs for implementing processing cores 220 (e.g., different designs having different combinations of HDL descriptions, cell libraries, technology, and/or clock frequencies). For example, by processing steps 400-406, tools 302 may generate a first possible design (implementation) for core 220 using a first HDL description, a first clock frequency, a first fabrication technology, and a first cell library of the first fabrication technology, may generate a second possible design for core 220 using the first HDL description, a second clock frequency, the first fabrication technology, and the first cell library of the first fabrication technology, may generate a third possible design for core 220 using the first HDL description, the first clock frequency, a second fabrication technology, and a first cell library of the second fabrication technology, may generate a fourth possible design for core 220 using a second HDL description, the second clock frequency, the second fabrication technology, and the first cell library of the second fabrication technology, etc.

At step 408, design system 300 may perform logic synthesis and placement and routing for each combination of the identified sets of circuit design architectures, fabrication technologies, cell libraries, and clock frequencies (e.g., for each possible design for core 220). For example, if system 300 identifies first and second design architectures, first and second fabrication technologies, first and second cell libraries associated with each fabrication technology, and first and second clock frequencies, system 300 may perform logic synthesis and placement and routing for a first implementation of processing circuitry 220 that includes the first design architecture, first fabrication technology, first cell library, and first clock frequency, a second implementation that includes the first design architecture, first fabrication technology, first cell library, and second clock frequency, a third implementation that includes the first design architecture, first fabrication technology, second cell library, and first clock frequency, a fourth implementation that includes the first design architecture, first fabrication technology, second cell library, and second clock frequency, a fifth implementation that includes the second design architecture, first fabrication technology, first cell library, and second clock frequency, etc.

At step 410, design system 300 may perform physical extraction and estimate the total power consumption of each combination of identified sets of circuit design architectures, fabrication technologies, cell libraries, and clock frequencies.

At step 412, design system 300 may generate (populate) one or more cost functions for optimizing based on each combination of the identified sets of circuit design architectures, fabrication technologies, cell libraries, and clock frequencies (e.g., based on each possible design implementation of core 220). For example, design system 300 may compute a corresponding value for the identified cost function for each implementation of circuitry 220 (e.g., for each combination of the identified sets of circuit design architectures, fabrication technologies, cell libraries, and clock frequencies). The cost function may, for example, take as an input, the particular design architecture, fabrication technology, cell library, and clock frequency that is used and output a corresponding cost function value.

The cost function used by design system 300 may be, for example, a power efficiency function, an area efficiency function, a dollar per compute function, or any other desired cost function that models the cost of implementing a particular design for core 220 in a desired unit (e.g., the dollars a particular design will cost, the chip area a particular design will cost, the power a particular design will consume, etc.). In an example where system 300 computes a power efficiency cost function, system 300 may simulate the power efficiency of each combination of design language description, technology, cell library, and clock frequency. Each particular combination of design language description, technology, cell library, and clock frequency that is modeled will generate a corresponding cost function value (e.g., a value output by the cost function). The set of all of the outputted cost function values generated for each possible combination of the obtained sets of technologies, cell libraries, clock frequencies, and design language descriptions will generate a corresponding 5-dimensional cost function surface.

In general, the set of all computed cost function values may be an N+1 dimensional cost function surface, where N is the number of different variables of the cost function (e.g., N is equal to four in the example where different circuit design architectures, fabrication technologies, cell libraries, and clock frequencies are obtained). In this way, design system 300 may populate an N+1 dimensional cost function surface (e.g., a data structure of cost function output values computed by populating the cost function that, when plotted, forms an N+1 dimensional surface) based on the design variables to be optimized. The design equipment may mine the aggregated experiment data to determine whether the selected design actually has optimum power, area, and performance characteristics. In other words, the cost function surface may be optimized (e.g., minimized) to determine an optimal combination of the inputs to the cost function.

At step 414, design system 300 may optimize the generated cost function (e.g., the generated N+1 dimensional surface). For example, design system 300 may compute a global minimum value of the cost function (e.g., a global minimum of the N+1 dimensional surface) and may identify the corresponding design parameters (e.g., inputs) that produced the global minimum value (e.g., the particular circuit design architecture, fabrication technology, cell library, and clock frequency that minimized the cost function). The optimal design for core 220 may be defined herein as the set of variables/inputs (e.g., the technology, cell library, clock frequency, and design language description) to the corresponding cost function that optimized that cost function.

At step 416, design system 300 may provide the optimized design parameters (e.g., the design parameter inputs to the cost function that minimized the cost function) to circuit construction and fabrication equipment. The fabrication equipment may build and fabricate processing circuitry 220 on integrated circuit 116 having the optimized design parameters. For example, the cost function may be minimized for a particular circuit architecture A, a particular fabrication technology T, a particular cell library L, and a particular clock frequency F. The fabrication equipment may generate core 220 having optimized architecture A using cell library L of fabrication technology T and may configure clocking circuitry 232 to clock core 220 with frequency F. In this way, core 220 may have dynamically optimized design constraints (e.g., core 220 may optimize area and power consumption in integrated circuit 116, etc.). By allowing clock frequency F to be optimized in addition to other inputs to the cost function, the design of core 220 may be more efficient than scenarios where clock frequency is provided as a fixed design constraint to the cost function (e.g., because allowing clock frequency F to vary allows clock frequency F to be optimized with respect to some fixed clock frequency design constraint).

The example of FIG. 4 is merely illustrative. If desired, one or more of the design constraints (e.g., the circuit design architectures, fabrication technologies, cell libraries, and clock frequencies) may be held fixed to one or more other optimal design constraints. In other words, design system 300 may, if desired, optimize one or more of the design constraints without optimizing the other potential design constraints. In one suitable arrangement, design system 300 may determine an optimized clock frequency for core 220 by optimizing a corresponding cost function (e.g., while holding the technology, cell library, and/or set of hardware design language descriptions as fixed constraints). By holding some design constraints fixed (e.g., fixing cell library, etc.), equipment 300 may reduce the time required to determine the optimal design for core 220 relative to when no constraints are fixed.

Figure 5:
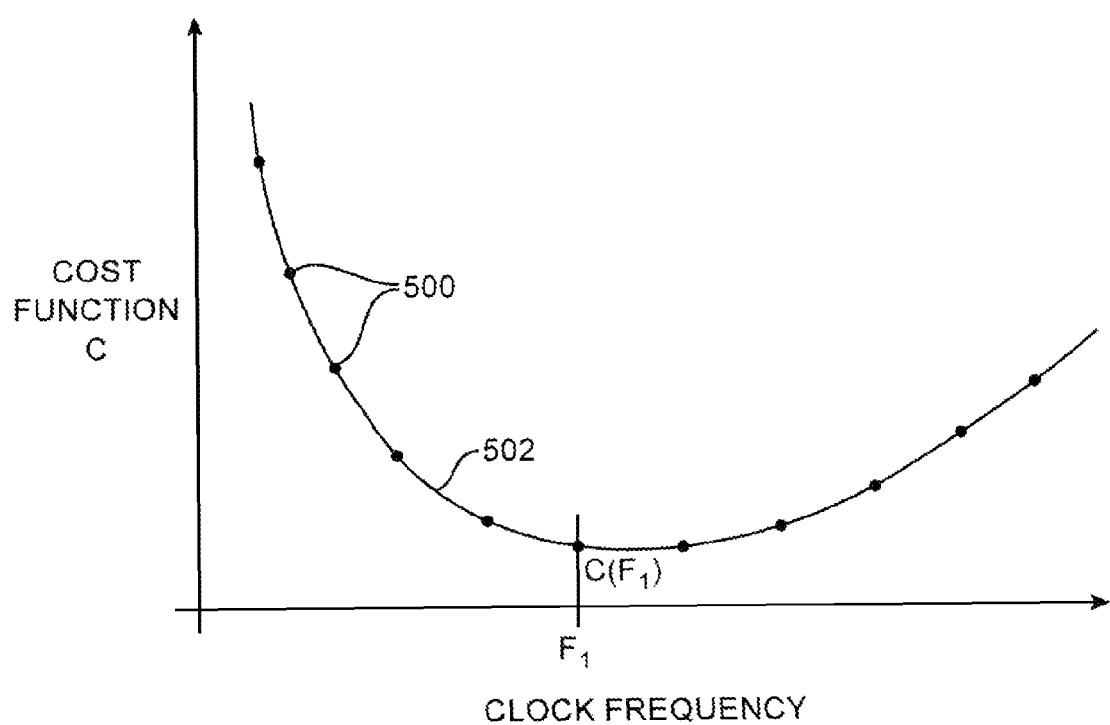
FIG. 5 is an illustrative plot showing how a circuit design system may generate an efficiency cost function based on different clock frequencies for a particular processing circuit design and showing how the circuit design system may process the cost function to generate an optimal clock frequency for the processing circuit design in accordance with an embodiment of the present invention.

FIG. 5 is an illustrative plot showing how equipment 300 may populate a cost function using a number of different clock frequencies for a fixed circuit design architecture, fabrication technology, and cell library. In this example, design system 300 may generate multiple implementations for core 220 having the fixed circuit design architecture, fabrication technology, and cell library but varying clock frequencies. Design system 300 may input each implementation of circuit 220 to a corresponding cost function C to output points 500 of cost function C (e.g., design system 300 may populate cost function 502 using cost function value points 500). Curve 502 may represent the cost function for the particular implementation of core 220 with differing clock frequencies. Cost function C may be, for example, a chip area efficiency cost function that takes different clock frequencies as an input, a power efficiency cost function that takes different clock frequencies as an input, a cost efficiency cost function (e.g., a dollar per compute cost function) that takes different clock frequencies as an input, etc.

Design system 300 may compute the global minimum $C(F_1)$ of curve 502 and may identify a clock frequency $F_1$ associated with the global minimum of curve 502 (e.g., the clock frequency $F_1$ at global minimum $C(F_1)$ of curve 502). Clock frequency $F_1$ may thereby be the optimal clock frequency for circuitry 220, because clock frequency $F_1$ minimizes cost function C (e.g., the input value that optimizes/minimizes cost function C may be defined as the optimal input value). Core 220 may subsequently be fabricated with clock frequency $F_1$ (and the fixed design language description, technology library, and cell library) and may be optimized with respect to cores having a fixed clock frequency constraint.

Figure 6:
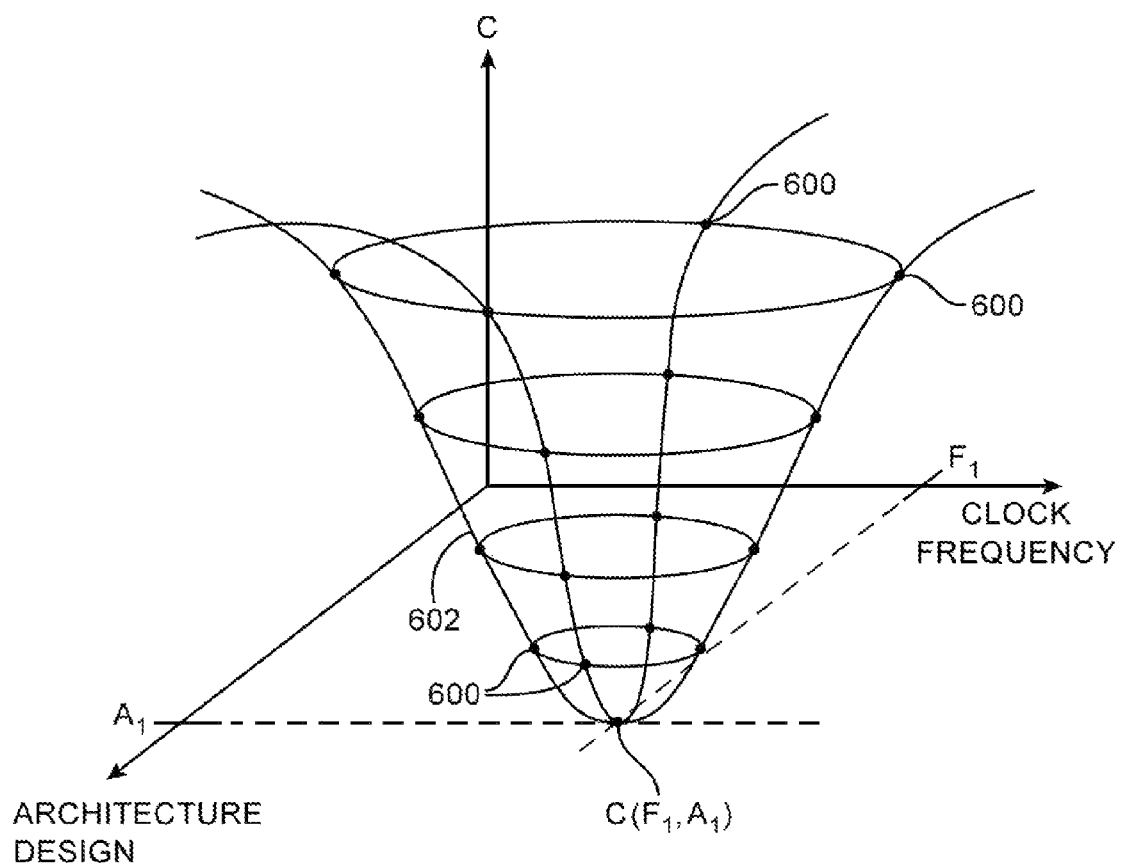
FIG. 6 is an illustrative plot showing how a circuit design system may generate a multi-dimensional efficiency cost function surface based on different clock frequencies and other variable circuit design parameters for a particular processing circuit design and showing how the circuit design system may process the cost function to generate optimal circuit design parameter values for the processing circuit design in accordance with an embodiment of the present invention.

If desired, additional design constraints (parameters) may be varied to increase the flexibility of optimization at the expense of time required to generate the optimized design constraints. FIG. 6 is an illustrative plot showing how a cost function may be populated using a number of different clock frequencies and circuit designs for a fixed fabrication technology and cell library. In this example, design system 300 may generate multiple implementations (designs) of core 220 having the fixed fabrication technology and cell library but varying clock frequencies F and design architectures A (e.g., hardware design language descriptions A). Input parameters F and A may be continuous or discrete values. Design system 300 may input each implementation of circuit 220 into cost function C to output points 600 of cost function C (e.g., while processing step 412 of FIG. 4). After populating cost function C, three-dimensional surface 602 may represent the cost function for the particular implementation of core 220 with differing architecture designs and clock frequencies.

Design system 300 may compute the global minimum $C(F_1,A_1)$ of surface 602 and may identify clock frequency $F_1$ and architecture design $A_1$ associated with the global minimum (e.g., the clock frequency $F_1$ and architecture design $A_1$ at which cost function C is minimized). Clock frequency $F_1$ may thereby be the optimal clock frequency for circuitry 220 and architecture design $A_1$ may thereby be the optimal architecture design for circuitry 220, because architecture $A_1$ and frequency $F_1$ minimizes cost function C. Core 220 may subsequently be fabricated using architecture $A_1$ and clocked at frequency $F_1$ (using the fixed technology and cell libraries) and may thereby be optimized with respect to cores having a fixed clock frequency constraint and a fixed architecture.

By varying architecture in addition to clock frequency, a core 220 fabricated using architecture $A_1$ and clock $F_1$ may be more efficient than a core fabricated using clock $F_1$ and fixed architecture such as a core generated according to FIG. 5 (e.g., more power efficient in the scenario where cost function C is a power efficiency cost function, more chip area efficient in the scenario where cost function C is an area efficiency cost function, more cost efficient in the scenario where cost function C is a dollar per compute cost function, etc.), whereas more time may be required to determine optimal architecture $A_1$ and clock $F_1$ as in FIG. 6 than to determine only clock $F_1$ as in FIG. 5.

If desired, cost function C may be generalized to a surface of N+1 dimensions, where N is equal to one greater than the number of variable design constraints (e.g., a five dimensional surface when the circuit design architecture, fabrication technology, cell library, and clock frequency is varied, a four dimensional surface where clock frequency, technology, and design architecture are varied, etc.). The N+1 dimensional surface may thereby be minimized or otherwise optimized to determine each optimal design parameter (input). This example in which cell library, clock frequency, technology library, and hardware design language description are the design parameters that are optimized is merely illustrative and, in general, any desired logic design constraints may be optimized for fabricating optimal processing circuits 220. By optimizing at least the clock frequency of cores 220 using cost function C, design equipment 300 may generate cores that are more efficient than cores designed under the assumption that clock frequency is a predetermined, fixed (non-variable) constraint. By allowing any desired combination of design parameters to be varied, equipment 300 may flexibly optimize the efficiency of cores 220 or any other desired processing circuitry.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating circuit design computing equipment, the method comprising:

with the circuit design computing equipment, discovering an optimized design constraint associated with an integrated circuit;

with the circuit design computing equipment, discovering an optimized clock signal frequency for the integrated circuit; and with the circuit design computing equipment, outputting the discovered optimized clock signal frequency and the discovered optimized design constraint for the integrated circuit to external equipment, wherein discovering the optimized design constraint comprises:

populating a cost function using a plurality of different fabrication technology libraries for the integrated circuit; and identifying a fabrication technology library of the plurality of different fabrication technology libraries that minimizes the populated cost function as the optimized design constraint.

2. The method defined in claim 1, wherein discovering the optimized clock signal frequency comprises:
   populating the cost function using a plurality of different clock signal frequencies; and
   identifying a clock signal frequency of the plurality of different clock signal frequencies that minimizes the populated cost function as the optimized clock signal frequency.

3. The method defined in claim 1, wherein discovering the optimized design constraint further comprises:
   populating the cost function using a plurality of different circuit design architectures for the integrated circuit; and
   identifying a circuit design architecture of the plurality of different circuit design architectures that minimizes the populated cost function as the optimized design constraint.

4. The method defined in claim 3, wherein the plurality of different circuit design architectures comprises a plurality of different aspect ratios for the integrated circuit, populating the cost function comprises populating the cost function using the plurality of different aspect ratios, and identifying the circuit design architecture of the plurality of different circuit design architectures comprises identifying an aspect ratio of the plurality of different aspect ratios that minimizes the populated cost function as the optimized design constraint.

5. The method defined in claim 3, wherein the plurality of different circuit design architectures comprises a plurality of different pin layouts for the integrated circuit, populating the cost function comprises populating the cost function using the plurality of different pin layouts, and identifying the circuit design architecture of the plurality of different circuit design architectures comprises identifying a pin layout of the plurality of different pin layouts that minimizes the populated cost function as the optimized design constraint.

6. The method defined in claim 1, wherein discovering the optimized design constraint further comprises:
   populating the cost function using a plurality of different cell libraries for the integrated circuit; and
   identifying a cell library of the plurality of different cell libraries that minimizes the populated cost function as the optimized design constraint.

7. A method of using circuit design equipment to design a processing circuit, the method comprising:
   with the circuit design equipment, identifying a plurality of clock signal frequencies for the processing circuit;
   with the circuit design equipment, identifying an optimal clock signal frequency from the plurality of clock signal frequencies; and
   with the circuit design equipment, providing a logic design that implements the identified optimal clock signal frequency to circuit fabrication equipment for fabricating the processing circuit based on the logic design and the identified optimal clock signal frequency, wherein identifying the optimal clock signal frequency of the plurality of clock signal frequencies comprises:
      synthesizing, placing, and routing a first circuit design having a first clock signal frequency of the identified plurality of clock signal frequencies;
      synthesizing, placing, and routing a second circuit design having a second clock signal frequency of the identified plurality of identified clock signal frequencies that is different from the first clock signal frequency;
      after synthesizing, placing, and routing the first circuit design, and after synthesizing, placing, and routing the second circuit design, generating a cost function based on the synthesized, placed, and routed first circuit design and the synthesized, placed, and routed second circuit design; and
      optimizing the generated cost function to identify the optimal clock signal frequency.

8. The method defined in claim 7, wherein optimizing the generated cost function comprises:
   inputting the synthesized, placed, and routed first circuit design to the generated cost function to generate a first cost function value;
   inputting the synthesized, placed, and routed second circuit design to the generated cost function to generate a second cost function value;
   identifying whether the first cost function value is less than the second cost function value;
   in response to identifying that the first cost function value is less than the second cost function value, identifying the first clock signal frequency as the optimal clock signal frequency; and
   in response to identifying that the second cost function value is not less than the second cost function value, identifying the second clock signal frequency as the optimal clock signal frequency.

9. The method defined in claim 7, wherein the cost function comprises a power efficiency cost function.

10. The method defined in claim 7, wherein the cost function comprises a chip area efficiency cost function.

11. The method defined in claim 7, wherein the cost function comprises a dollar per compute cost function.

12. The method defined in claim 7, further comprising:
   with the circuit design equipment, identifying a plurality of hardware description language files for the given logic design;
   with the circuit design equipment, identifying an optimal hardware design language description file for the given logic design; and
   with the circuit design equipment, providing the identified optimal hardware description language file to the fabrication equipment for fabricating the processing circuit based on the given logic design, the identified optimal clock signal frequency, and the identified optimal hardware description language file.

13. The method defined in claim 12, further comprising:
   with the circuit design equipment, identifying a plurality of fabrication technology libraries for the given logic design;
   with the circuit design equipment, identifying an optimal fabrication technology library for the given logic design; and
   with the circuit design equipment, providing the identified optimal fabrication technology library to the fabrication equipment for fabricating the processing circuit based on the given logic design, the identified optimal clock signal frequency, the identified optimal hardware description language file, and the identified optimal fabrication technology library.

14. The method defined in claim 13, further comprising:
   with the circuit design equipment, identifying a plurality of cell libraries for the given logic design;
   with the circuit design equipment, identifying an optimal cell library for the given logic design; and with the circuit design equipment, providing the identified optimal cell library to the fabrication equipment for fabricating the processing circuit based on the given logic design, the identified optimal clock signal frequency, the identified optimal hardware description language file, the identified optimal fabrication technology library, and the identified optimal cell library.

15. The method defined in claim 12, further comprising:
with the circuit design equipment, identifying a plurality of pin layouts for the given logic design;
with the circuit design equipment, identifying an optimal pin layout for the given logic design; and
with the circuit design equipment, providing the identified optimal pin layout to the fabrication equipment for fabricating the processing circuit based on the given logic design, the identified optimal clock signal frequency, the identified optimal hardware description language file, and the identified optimal pin layout.

16. A method of operating circuit design equipment, the method comprising:
with the circuit design equipment, identifying a logic design for a circuit, wherein the logic design specifies a plurality of chip area constraints for the circuit;
with the circuit design equipment, identifying a plurality of clock signal frequencies for the circuit;
with the circuit design equipment, generating a cost function based on the plurality of chip area constraints and the plurality of clock signal frequencies for the circuit; and
with the circuit design equipment, optimizing the generated cost function to identify an optimal clock signal frequency of the plurality of clock signal frequencies and an optimal chip area constraint of the plurality of chip area constraints for the circuit.

17. The method defined in claim 16, further comprising:
with the circuit design equipment, providing the logic design, the identified optimal chip area constraint, and the identified optimal clock signal frequency to integrated circuit fabrication equipment, wherein the integrated circuit fabrication equipment is configured to fabricate an integrated circuit chip having the logic design, the optimal chip area constraint, and the optimal clock signal frequency.

18. The method defined in claim 16, wherein the plurality of chip area constraints comprises a plurality of pin layouts for the circuit and optimizing the generated cost function comprises identifying an optimal pin layout of the plurality of pin layouts for the circuit.

19. The method defined in claim 16, wherein the plurality of chip area constraints comprises a plurality of aspect ratios for the circuit and optimizing the generated cost function comprises identifying an optimal aspect ratio of the plurality of aspect ratios for the circuit.

20. The method defined in claim 16, wherein generating the cost function based on the plurality of chip area constraints and the plurality of clock signal frequencies for the circuit comprises identifying a surface of at least three dimensions, wherein optimizing the generated cost function comprises identifying a global minimum of the surface, and wherein the optimal chip area constraint and the optimal clock signal frequency correspond to a point on the surface at the global minimum.

21. The method defined in claim 16, wherein generating the cost function based on the plurality of chip area constraints and the plurality of clock signal frequencies for the circuit comprises:
generating a first cost function value by inputting a first chip area constraint of the plurality of chip area constraints and a first clock signal frequency of the plurality of clock signal frequencies to the cost function; and
generating a second cost function by inputting a second chip area constraint of the plurality of chip area constraints and a second clock signal frequency of the plurality of clock signal frequencies to the cost function, wherein the first chip area constraint is different from the second chip area constraint and the second clock signal frequency is different from the first clock signal frequency, and wherein optimizing the generated cost function comprises:
identifying which of the first and second cost function values is smaller;
in response to identifying that the first cost function value is smaller than the second cost function value, identifying the first chip area constraint as the optimal chip area constraint and identifying the first clock signal frequency as the optimal clock signal frequency; and
in response to identifying that the second cost function value is smaller than the first cost function value, identifying the second chip area constraint as the optimal chip area constraint and identifying the second clock signal frequency as the optimal clock signal frequency.

* * * * *